United States Patent
Brannen (10) Patent No.: US 9,083,273 B2
(45) Date of Patent: Jul. 14, 2015

(54) POSITION CORRECTED PULSE WIDTH MODULATION FOR BRUSHLESS DIRECT CURRENT MOTORS

(75) Inventor: Robert Alan Brannen, Phoenix, AZ (US)

(73) Assignee: Agave Semiconductor, LLC, Phoenix, AZ (US)

( * ) Notice: Subject to any disclaimer, the term of this patent is extended or adjusted under 35 U.S.C. 154(b) by 316 days.

(21) Appl. No.: 13/598,957

(22) Filed: Aug. 30, 2012

(65) Prior Publication Data

US 2012/0326643 A1  Dec. 27, 2012

Related U.S. Application Data

(63) Continuation-in-part of application No. PCT/US2011/026743, filed on Mar. 1, 2011.

(60) Provisional application No. 61/309,791, filed on Mar. 2, 2010.

(51) Int. Cl.
H02P 6/00  (2006.01)
H02P 6/18  (2006.01)

(52) U.S. Cl.
CPC .................................. H02P 6/18 (2013.01)

(58) Field of Classification Search
USPC .............. 318/599, 572, 811, 400.11; 702/150
See application file for complete search history.

(56) References Cited

U.S. PATENT DOCUMENTS

| | | | | |
|---|---|---|---|---|
| 5,493,187 A | * | 2/1996 | Iijima | 318/400.14 |
| 2006/0149496 A1 | * | 7/2006 | Takeuchi | 702/150 |
| 2010/0109655 A1 | * | 5/2010 | Tanaka et al. | 324/207.25 |
| 2010/0134060 A1 | * | 6/2010 | Vermeir | 318/400.32 |

FOREIGN PATENT DOCUMENTS

| | | | |
|---|---|---|---|
| JP | 2001178173 A | | 6/2001 |
| JP | 2007020345 A | | 1/2007 |
| JP | 2008236932 A | | 10/2008 |
| KR | 20060096931 A | | 9/2006 |
| KR | 20090008944 A | | 1/2009 |
| KR | 20090130415 A | | 12/2009 |
| KR | 20090130415 A | * | 12/2009 |

OTHER PUBLICATIONS

ISA Korea, International Search Report and Written Opinion of PCT/US2011/026743, Oct. 31, 2011, WIPO, 10 pages.

* cited by examiner

*Primary Examiner* — Shawki S Ismail
*Assistant Examiner* — Jorge L Carrasquillo
(74) *Attorney, Agent, or Firm* — Alleman Hall McCoy Russell & Tuttle LLP (57) ABSTRACT

A method of operating a brushless direct current motor is provided that generates a rotor position dependent pulse width modulation waveform. The waveform can improve motor efficiency and reduce torque variation.

11 Claims, 9 Drawing Sheets

POSITION CORRECTED PULSE WIDTH MODULATION FOR BRUSHLESS DIRECT CURRENT MOTORS

CROSS REFERENCE TO RELATED APPLICATIONS

This application is a continuation-in-part of International Patent Application Ser. No. PCT/US2011/026743, filed Mar. 1, 2011 and entitled POSITION CORRECTED PULSE WIDTH MODULATION FOR BRUSHLESS DIRECT CURRENT MOTORS, which claims priority to U.S. Provisional Patent Application Ser. No. 61/309,791, filed Mar. 2, 2010 and entitled POSITION CORRECTED PULSE WIDTH MODULATION FOR BRUSHLESS DIRECT CURRENT MOTORS, the entirety of both of which are hereby incorporated herein by reference for all intents and purposes.

FIELD

This description is directed to motor controllers for brushless direct current motors. In particular, a system and method for generating pulse width modulated motor control commands is disclosed.

BACKGROUND AND SUMMARY

Pulse width modulation (PWM) is a common technique used to control the average speed of brushless direct current (BLDC) motors. Direct current motors have a characteristic that their speed is nearly linearly proportional to the average voltage applied across the motor windings. In a PWM controlled motor, a PWM waveform is used to control switches connecting the motor windings to a power supply. This is done in such a way that the average voltage across the motor is equal to the PWM duty cycle multiplied by the voltage of the power supply. Linear voltage regulators are also used to vary the DC voltage across BLDC motors; but they have the disadvantage of power losses across their pass elements.

PWM control signals are pulse trains where the duty cycle of the signal is defined as the average time high divided by the period. The period of the PWM control signal is typically chosen to be much smaller than the rotational period of the motor. Thus, many PWM pulses may occur within one rotation of the motor; and the pulses of equal width (duration) are evenly distributed throughout the motor rotation.

Torque and motion in BLDC motors are a result of the attraction and repulsion between the magnetic poles on the rotor and stator. The torque is a function of the magnetic field strength between the rotor and stator poles, as well as the geometry of the motor, and the relative angular position between the rotor and stator. In BLDC motors the magnetic pole orientation (and current) of the windings is reversed using commutation switches which replace the split ring commutator found in brushed motors. In order to avoid shorting out the power supply, there is a short commutation delay between when the winding current flowing in one direction is turned off, and the time before current is turned on in the other direction. This is analogous to the gap in the split ring commutator of brushed motors.

Applying a uniform PWM pulse train to control the speed of a BLDC motor has several disadvantages. For example, the energy is applied in the same manner throughout one rotation of the rotor and therefore fails to recognize physical differences in the motor that are related to rotor position. Thus, applying power to a motor in this manner can produce non-uniform torque output from the motor, increased audible noise from the motor, and energy losses that are higher than is desirable.

The inventor herein has recognized the above-mentioned disadvantages and has developed a method for improving motor control. In one embodiment of the present description, a method for controlling a brushless direct current motor, comprising: generating a motor command signal during a commutation interval of said brushless direct current motor; and adjusting a common attribute of at least two non-zero pulses of said motor command signal such that said at least two non-zero pulses of said motor command signal are not uniform.

By adjusting the width of pulses that make up a motor command signal during a commutation period of a motor cycle, operation of a motor may be improved. In particular, adjusting pulse widths of individual pulses that form a pulse train delivering energy to a motor can improve motor efficiency, reduce motor audible noise, and improve torque output characteristics of the motor. In one example, the first few pulses that are included in the pulse train of a motor commutation interval have a shorter duration (e.g., the amount if time a signal is high is shorter than the amount of time the signal is low during the period of a pulse). As the commutation interval continues, the pulses increase in duration for a time during the motor commutation interval. Finally, the pulse duration is decreased near the end of the motor commutation interval. This pulse train generating strategy can account for the position of motor poles during motor rotation in adjusting the pulse width so that attraction and repulsion between motor poles is improved and made more efficient, at least during some conditions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

Figure 1:
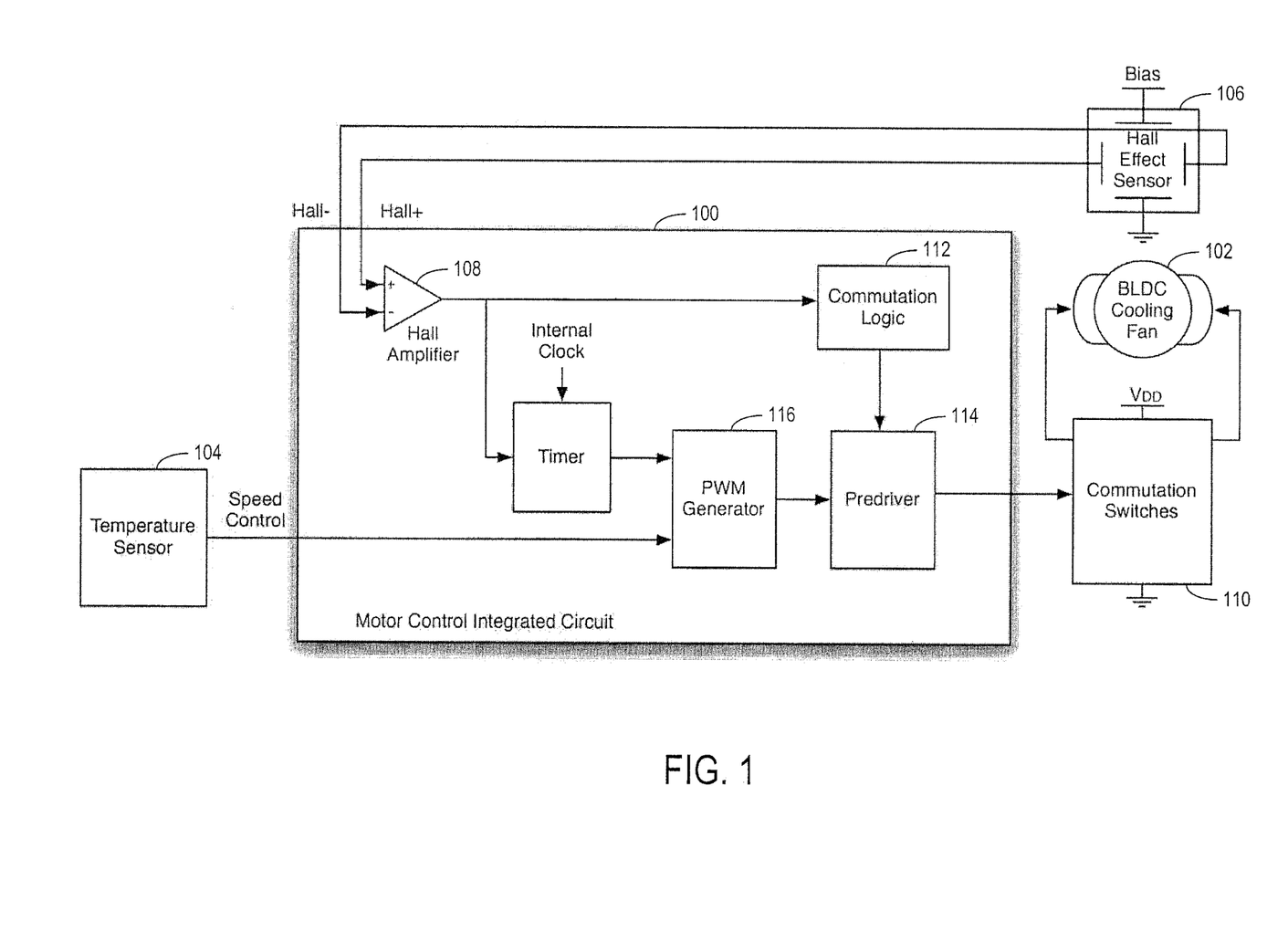
FIG. 1 is a block diagram of a motor control integrated circuit (IC) in a typical brushless direct current (BLDC) motor application.

FIG. 1 shows a block diagram of a typical application for a motor control integrated circuit 100. In this example the brushless direct current (BLDC) motor 102 is a cooling fan, although it could be any BLDC motor. In the cooling fan application a temperature sensor 104 reports the system temperature to motor control integrated circuit (IC) 104 in the form of a speed control signal representing the desired speed for the fan. The differential output of a Hall Effect Sensor 106 gets amplified by a Hall Amplifier 108 to determine how the rotor's magnetic poles, north and south, are oriented with respect to the stator. Commutation Switches 110 connect the fan's motor windings to the power supply (labeled $V_{DD}$) and ground. The motor control IC 100 uses the magnetic pole information together with Commutation Logic block 112, Pre-Driver 114, and Commutation Switches 110 to commutate the current in the stator windings. A pulse width module (PWM) Generator 116 adjusts the PWM duty cycle to the switches in order to set the average voltage across the fan motor. As the rotor turns, the motor control IC 100 uses an internal clock and timer to determine the frequency of the commutation which represents the actual speed of the fan. Knowledge of the actual speed of the fan can be used in a closed loop fashion to adjust the PWM duty cycle until the fan's actual speed equals the desired speed set by the temperature sensor 104.

The temperature sensor 104 may be a simple thermistor or a complex digital system. The speed control signal can be in the form of a direct current (DC) voltage, a digital control word, or a PWM signal; each representing the desired speed of the cooling fan. In the following discussion, for simplicity, it is assumed the speed control signal is a DC voltage. The Commutation Switches 110 are typically configured as an H-Bridge; but can also be configured differently for different coil winding configurations. The Commutation Switches 110 could be integrated into the motor control IC 100; but for illustrative purposes are shown externally. In one embodiment, the motor control IC 100, the Commutation Switches 110, and the Hall Effect Sensor 106 along with the rotor and stator windings are all physically contained within the cooling fan.

Figure 2:
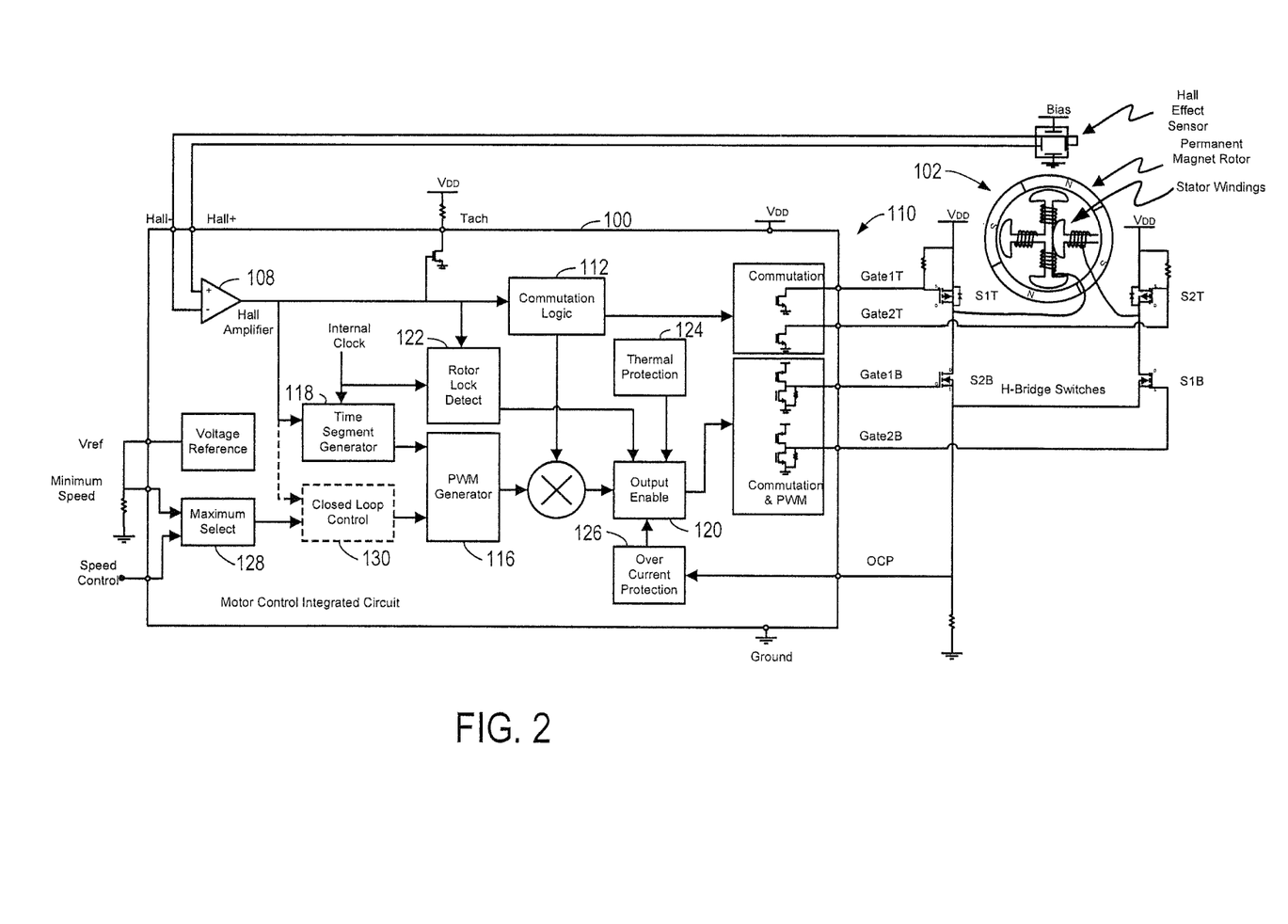
FIG. 2 is a more detailed block diagram of FIG. 1, showing greater detail of the motor control IC, the BLDC motor and the commutation switches.

A more detailed block diagram of the motor control IC 100 is shown in FIG. 2 along with expanded views of the commutation switches 110 and BLDC motor 102. The commutation switches 110 are configured as an H-Bridge. The Time Segment Generator 118 and the PWM Generator 116 form the motor commands for driving the H-Bridge circuitry. These two blocks are shown in greater detail in FIG. 3. However, before explaining these blocks, the other blocks in FIG. 2 are described first beginning with the motor 102.

The permanent magnet rotor is shown with two pole pairs with the poles labeled N for north and S for south. In general, any number of pole pairs can be used. As the rotor spins, the rotor's magnetic pole closest to the Hall Effect sensor transitions from north to south and back again.

The Hall Effect Sensor's differential outputs are labeled Hall+ and Hall−. When the rotor is spinning with a constant angular velocity, the differential output Hall+ minus Hall− is nearly sinusoidal with an amplitude of a few hundred millivolts. This small differential signal is amplified by the Hall Amplifier 108 and is interpreted by the Motor Control IC 100 as north and south rotor position. The amplified Hall signal is pinned out of the IC as an open drain output on the Tach (tachometer) pin. As the rotor spins the Tach signal toggles between a logical one and zero. The rate at which this happens indicates the speed of the motor.

Commutation Logic 112 decodes the polarity information of the Hall Amplifier output; and is used to determine which of the pre-driver and H-Bridge driver switches gets turned on, and ultimately the direction of current flow in the stator windings.

The stator windings are coupled to the power supply through the H-Bridge switches and a resistor to ground. The power supply voltages are labeled $V_{DD}$ and Ground. The two PMOS switches are labeled S1T and S2T for switch 1 top and switch 2 top respectively. Likewise, the two NMOS switches are labeled S1B and S2B switch 1 bottom and switch 2 bottom respectively. When a rotor pole closest to the Hall Effect Sensor has north polarity, H-Bridge switches S1T and S1B will conduct causing current to flow in one direction through the windings. When a rotor south pole is closest to the Hall Effect sensor, H-Bridge switches S2T and S2B conduct causing the current in the windings to flow in the other direction. Reversing the direction of the winding current will cause the stator magnetic poles to reverse polarity. As the rotor turns, the reversing of the stator winding current is known as commutation. In order to avoid shorting out the power supply to ground during commutation, only one pair of switches is allowed to be on at a time. There is a small delay known as commutation delay between when one pair of switches turns off and the other pair of switches turns on.

The pre-driver block 114 of FIG. 1 has been expanded into two different blocks in FIG. 2. The pre-driver block labeled "Commutation" controls the PMOS H-Bridge switches S1T and S2T. The output pins are labeled Gate1T and Gate2T because they are the voltages on the gates of the PMOS switches S1T and S2T. In a typical H-Bridge application, the top switches are not controlled with PWM and only transition at the commutation frequency. Because PMOS transistors are used in this example for the top H-Bridge switches; they conduct when their gate voltages are low.

The second pre-driver block is labeled "Commutation & PWM". It controls the NMOS H-Bridge switches S1B and S2B. The output pins are labeled Gate1B and Gate2B because they are the voltages on the gates of the NMOS switches S1B and S2B. Gate1B transitions at the PWM frequency when the rotor Hall amplifier reports north and is held low otherwise. Gate2B transitions at the PWM frequency when the Hall amplifier reports south and held low otherwise.

In one embodiment, a control IC provides several degradation protection features built in for the safety of the motor. Referring back to FIG. 2, the Output Enable block 120 enables the bottom NMOS H-Bridge switches to conduct current only if no degradation conditions exist. If a condition of degradation occurs, the bottom switches in the H-Bridge are turned off, disabling current to the motor windings. In the example of FIG. 2, three degradation conditions are detected which can disable the motor: rotor lock, thermal overload, and current overload. The Rotor Lock Detect block 122 monitors the Hall Amplifier output and uses the internal clock to measure the rotor speed. If the rotor speed falls below a preset threshold, it is assumed there is a blockage stopping the rotor and the motor is disabled before unsafe current levels build up in the windings. The motor Control IC 100 has its own thermal sensor located inside the Thermal Protection block 124. As the Motor Control IC 100 is typically located inside the motor, the IC temperature is an indication of the motor temperature. If the IC temperature rises above a threshold temperature, the motor is disabled. Finally, the stator winding current is sensed across a resistor between the over current protection (OCP) pin and ground. The Over Current Protection block 126 monitors the stator winding current. If the current exceeds a predetermined safety limit, then the motor is disabled.

The speed control input tells the Motor Control IC 100 the desired speed of the motor. In certain applications, it is desired that the speed of the motor never drop below a specified level. The minimum speed input is an extra speed control input which can be used to set this minimum allowed speed. The Motor Control IC 100 has a voltage reference output pin labeled Vref. The minimum speed can be set using a resistor divider between the Vref pin and ground. The Maximum Select block 128 chooses which of the two speed control inputs will be used to control the speed of the motor; either the minimum speed input or the speed control input. If the voltage labeled "speed control" falls below the voltage on the minimum speed pin, then the minimum speed input will be used.

An optional Closed Loop Control block 130 is shown in dashed lines. As the rotor turns, an internal clock and timer determine the frequency of the commutation which represents the motor's actual speed. The Closed Loop Control block 130 can dynamically adjust the input to the PWM Generator 116 until the motor's actual speed equals the motor's desired speed as defined by the output of the Maximum Select block 128. If closed loop control is not used, the output of the Maximum Select block 128 is passed directly to the PWM Generator 116. The output of the Closed Loop Control block 130 (input to the PWM Generator) is labeled "Closed Loop Speed Control" in FIG. 3.

Figure 4:
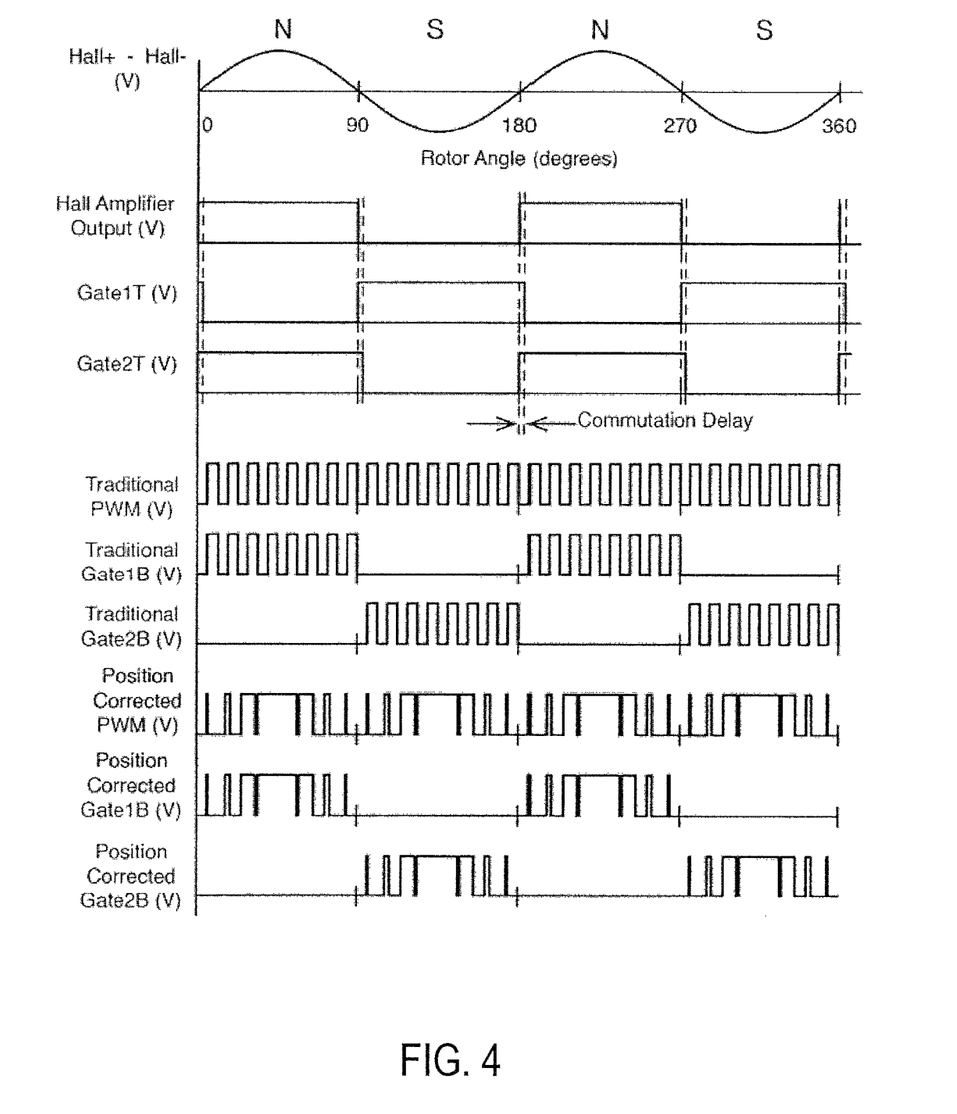
FIG. 4 is a timing diagram showing the relation of the rotor angle, the magnetic pole closest to the Hall Effect sensor, the Hall Amplifier output, the PWM waveforms, and the pre-driver outputs.

FIG. 4 shows the relative timings of the rotor angle, the magnetic pole closest to the Hall Effect sensor, the Hall Amplifier output; the PWM waveforms, and the pre-driver outputs Gate1B, Gate2B, Gate1T, and Gate2B. FIG. 4 also compares an example of traditional PWM waveforms with position corrected PWM waveforms. The traditional PWM waveforms have uniformly distributed pulses with the same pulse width. On the other hand, the position corrected PWM waveforms in this description have varying duty cycles dependent on the rotor position. Rotor movement and torque in DC motors are based on the magnetic attraction and repulsion between the stator and rotor. The magnitude of the torque is angularly dependent based on the geometry of the motor. A uniformly distributed PWM waveform will result in wasted energy being applied to the motor during times of minimum torque. The wasted energy shows up as current spikes in the motor windings and excess heat.

In contrast, the position corrected PWM method generates a motor command signal during a commutation interval of said brushless direct current motor, and adjusting a common attribute of at least two non-zero pulses of said motor command signal such that said at least two non-zero pulses of said motor command signal are not uniform. The common attribute may be a pulse width or a pulse amplitude. In one embodiment, the first pulse of the two non-zero pulses has a shorter duration high level pulse width than the second pulse. And, a third non-zero pulse during said commutation interval, the third non-zero pulse produced after said second pulse, the third non-zero pulse having a shorter duration high level pulse width than said second pulse may also be provided. In addition, the common attribute is adjusted in response to a position of said brushless direct current motor in one embodiment. Further, the position of said brushless direct current motor is converted into a time segment counter signal, and the time segment counter signal is modified by a correction and converted to an analog signal. And, the analog signal is multiplied by a speed control adjustment and compared to an oscillating signal before being output to said brushless direct current motor as discussed below. In one embodiment, the brushless direct current motor is a fan motor and a motor command correction is selected from a plurality of correction profiles in response to an operating parameter. Further still, the adjustment of the common attribute is deactivated in response to a condition of degradation. For example, the adjustment of the common attribute is deactivated in response to a condition of degradation of the motor. This approach results in less energy being required to run the motor at any given speed. This approach also allows for less torque variation within one rotation resulting in less audible noise.

As may be readily determined from the description, a method for controlling a brushless direct current motor is provided, comprising: generating a signal indicative of a position of a brushless direct current motor, and generating a motor command signal from said signal during a commutation interval, said motor command signal comprising at least two non-zero pulses where at least one common attribute of each of said two non-zero pulses is different between the two non-zero pulses.

Although FIG. 4 shows PWM waveforms, it will be appreciated that any suitable pulse train attribute may be modulated alone or in combination with the pulse width (or duration) to provide a position corrected motor control signal. For example, amplitude of a pulse train may be varied based on rotor position as described above. In this way, energy and/or heat spikes may be eliminated in angular rotational ranges where torque is greater so as to reduce energy usage and heat production.

Neglecting improvements in motor performance, the average value of a pulse train attribute that is varied over a commutation interval is equal to an average value of a pulse train attribute that is not varied over the commutation interval. In other words, although a pulse width attribute may be varied over a commutation interval, the average value of that pulse train attribute tracks an average value of a waveform that is not varied.

Figure 3:
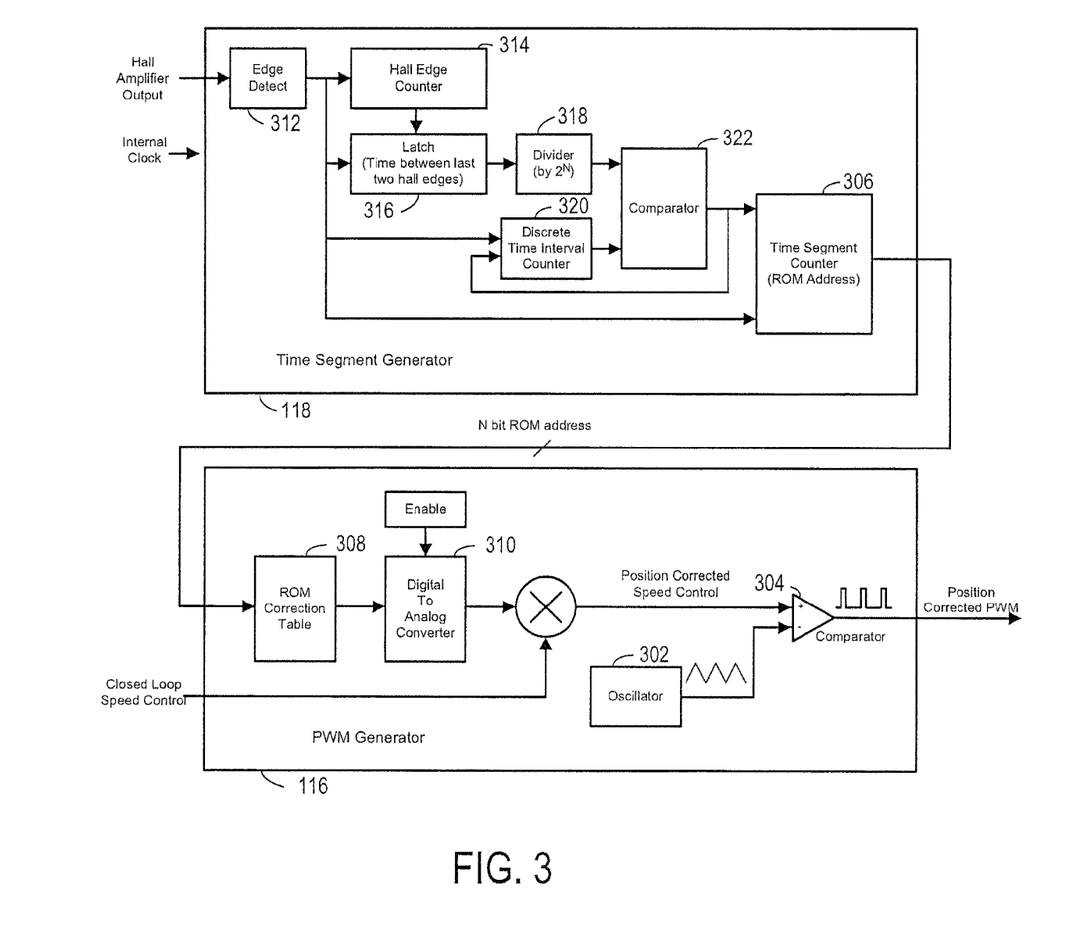
FIG. 3 is a block diagram showing in greater detail the time segment generator and pulse width modulation (PWM) generator blocks of FIG. 2.

The two remaining blocks of FIG. 2 are the Time Segment Generator 118 and the PWM Generator 116. More detailed block diagrams of these two blocks are illustrated in FIG. 3. Together these blocks generate the position corrected PWM waveforms of FIG. 4; and represent the core ideas of the present disclosure.

Figure 5:
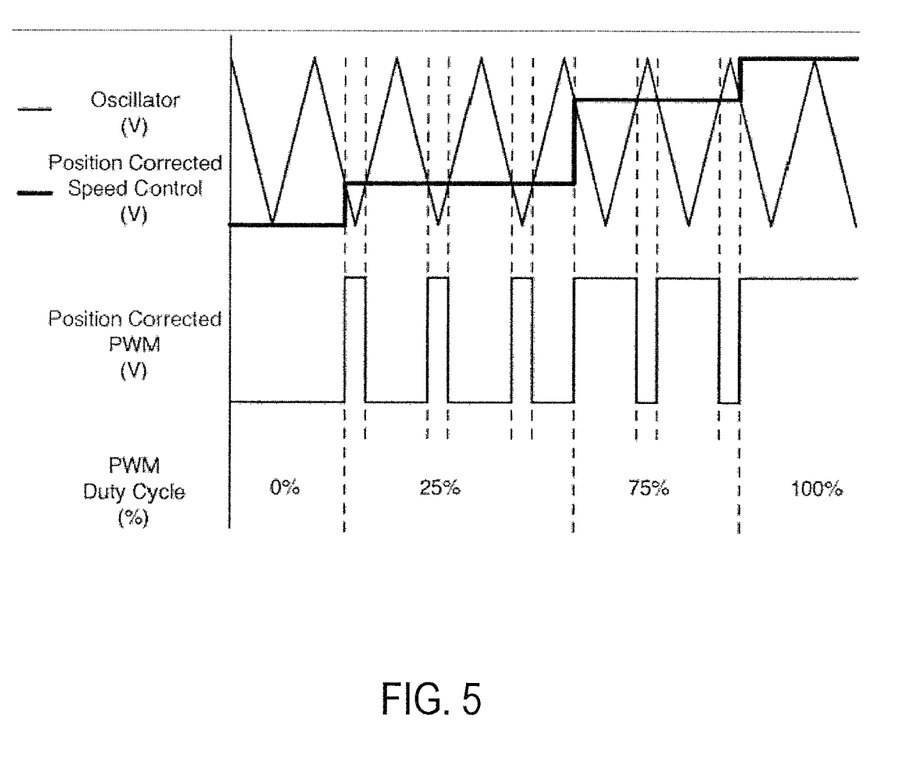
FIG. 5 is a timing diagram showing how a PWM waveform is generated using an oscillator, a control signal and a comparator.

Inside the PWM Generator of FIG. 3 is an oscillator 302 that generates a triangle waveform. An analog comparator 304 is used to compare the triangle wave against the position corrected speed control voltage. The output of the comparator is high when the position corrected speed control voltage is larger than the triangle voltage. This results in the position corrected PWM signal at the output of the comparator. The timing diagram of FIG. 5 shows the analog voltages of this comparison and the resulting PWM waveform. In some embodiments, the triangle wave oscillator and analog comparator may be replaced with a high frequency clock and a counter to generate a digitized PWM waveform. For the purpose of this disclosure analog voltages are illustrated for clarity. Among other disclosure, the present description includes generation of a position corrected speed control signal, and results in the position corrected PWM waveforms of FIG. 4.

Figure 6:
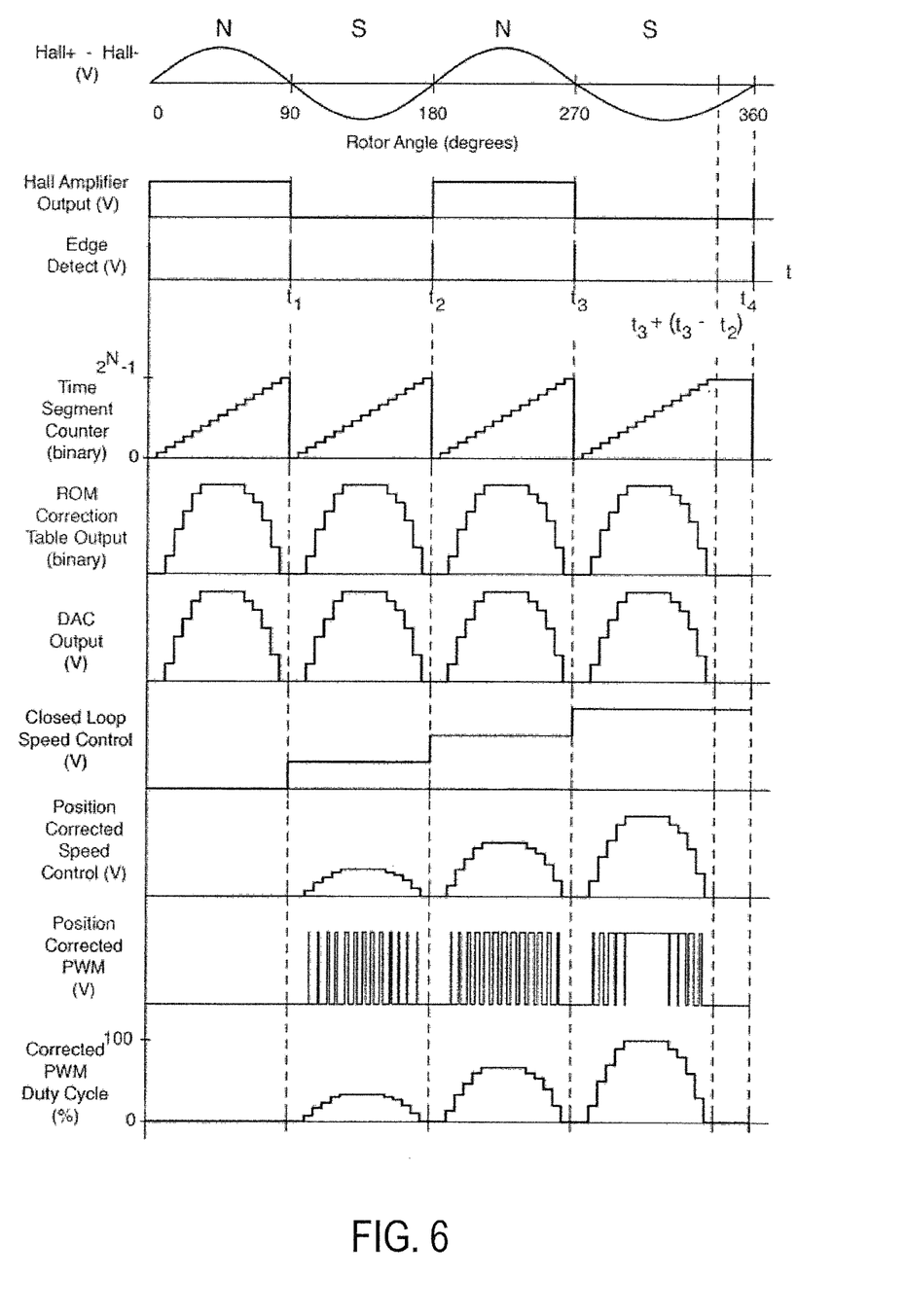
FIG. 6 is a timing diagram showing the relation between position corrected PWM waveforms and the rotor angle.

The relation between the waveforms of the Time Segment Generator 118 and PWM Generator 116 of FIG. 3 are illustrated in the timing diagram of FIG. 6. Note in this timing diagram the rotor slows down between 270° and 360°. This is done to emphasize the rate at which the Time Segment Counter steps through the time segments is based on the time between previous Hall edges.

The Hall amplifier output reports when the rotor's magnetic pole closest to the Hall Effect sensor transitions from north to south and back again as the rotor spins. As shown in FIG. 6, the rising and falling edges of the Hall Amplifier output are edge detected at times $t_1$, $t_2$, $t_3$ and $t_4$. Without the use additional sensors, these are the only times the rotor position is known with any certainty as the rotor spins. However, the relative change in rotor position after a hall edge occurs can be calculated with knowledge of the rotor's angular velocity and the time that has lapsed since the last edge was detected. Let θ be the rotor angle at time t, let $t_k$ and $t_{k-1}$ be the times of the previous two Hall edges, and let $\theta_k$ be the rotor angle at time $t_k$. If the rotor is moving with a constant angular velocity then the change in rotor angle can be calculated as $$\theta - \theta_k = \frac{t - t_k}{t_k - t_{k-1}} * \frac{360°}{2*P}$$

Where P equals the number of magnetic pole pairs in the rotor. For the two pole pair rotor shown in FIG. 2, the change in rotor angle for time t between $t_2$ and $t_2$ can be calculated as $$\theta - \theta_2 = \frac{t - t_2}{t_2 - t_1} * 90°$$

The Time Segment Generator 118 in FIG. 3 divides the time between the previous two Hall edges is divided into $2^N$ equal length time segments, where N is the number of bits in the ROM Correction Table address. These time segments correspond to $2^N$ discrete angular positions between 0° and 90°. The internal clock increments the Time Segment Counter 306 through the $2^N$ time segments at a rate determined by the speed of the rotor as recorded by the time between the two most recent Hall edges. The binary output of the Time Segment Counter 306 is used as the address word for the ROM Correction Table 308. The ROM Correction Table 308 stores a different binary correction factor (calibration word) for each of the $2^N$ time segments. The binary correction factors are input to the digital to analog convertor (DAC) 310. The DAC 310 converts the binary correction factors into analog voltages. As the Time Segment Counter 306 steps through the $2^N$ time segments, the DAC 310 outputs a staircase shaped analog correction waveform. In FIG. 6, the output of the ROM correction table is shown with binary units; and the output of the DAC is shown with voltage units.

The closed loop speed control input to the PWM Generator 116 of FIG. 3 is multiplied by the output of the DAC 310. In FIG. 6, the closed loop speed control voltage has four different amplitudes illustrating four separate examples of how the closed loop speed control voltage gets multiplied by the DAC output resulting in the position corrected speed control voltage. In normal steady state operation with the motor running at a constant speed, the closed loop speed control voltage will be a constant DC voltage, and will not vary as the rotor spins. The output of the multiplier is the position corrected speed control signal. This time varying position dependent analog voltage is then compared against the oscillator triangle wave to generate the position corrected PWM.

The Time Segment Generator 118 of FIG. 3 can be explained as follows. The Edge Detect block 312 marks in time when the rotor pole closest to the Hall Effect transitions from north to south and from south back to north. The internal clock, together with the Hall edge counter 314 measures the time between the last two Hall edges. This time is stored in the Latch 316 in the form of a binary count. The count is divided by $2^N$ and is held at the output of the divider 318 until the next Hall edge occurs (at which time it is updated). The output of the divider 318 is a binary word representing the duration of one time segment. The Discrete Time Interval Counter 320 is reset to zero at every Hall edge. It is allowed to count until its value reaches the value held at the output of the Divider 318. When this occurs, the Comparator 322 increments the Time Segment Counter 306 and resets the Discrete Time Interval Counter 320 back to zero. The Discrete Time Interval Counter 320 immediately starts counting again. This repeats until the Time Segment Counter 306 reaches a count equal to $2^N-1$ at which time everything stops. All counters are reset to zero at the next Hall edge and the process repeats itself.

Thus, the present description includes an integrated circuit (IC) comprising: a time segment generator that produces binary output from a divided position signal of a brushless direct current motor; and a pulse width modulation generator including a correction section that stores correction factors for binary output produced by said time segment generator, a digital to analog converter, an oscillator, and a comparator. In one embodiment, the position from a Hall Effect sensor coupled to said brushless direct current motor provides a signal that is converted into said divided position signal of said brushless direct current motor. Further, the time segment generator is further comprised of an edge detector that marks the last two Hall edges received from the edge detector, a latch to store the time received from the edge counter as a binary count, a divider to divide the binary count according to a number of bits in a correction factor table to provide a duration of one time segment, and a time segment counter to provide said binary output by incrementing through the time segments of the correction table at a rate determined by the time between the last two Hall edges. Further still, the correction section includes a factor table to receive the binary output from the time segment generator and provide a binary correction factor corresponding to each time segment of the motor control signal, a digital to analog converter to convert the binary correction factor corresponding to each time segment of the motor control signal into time varying position dependant analog voltages, and a comparator to compare the time varying position dependant analog voltage against an oscillating triangle wave to generate the position corrected pulse width modulated motor command signal. And, the correction factor table includes a plurality of correction factor profiles corresponding to each time segment of the binary output, and one of the plurality of correction factor profiles is selected based on at least one operating parameter. Further still, the digital to analog converter is disabled in response to an operating condition to provide the motor command signal without position corrected pulse width modulation.

Figure 7:
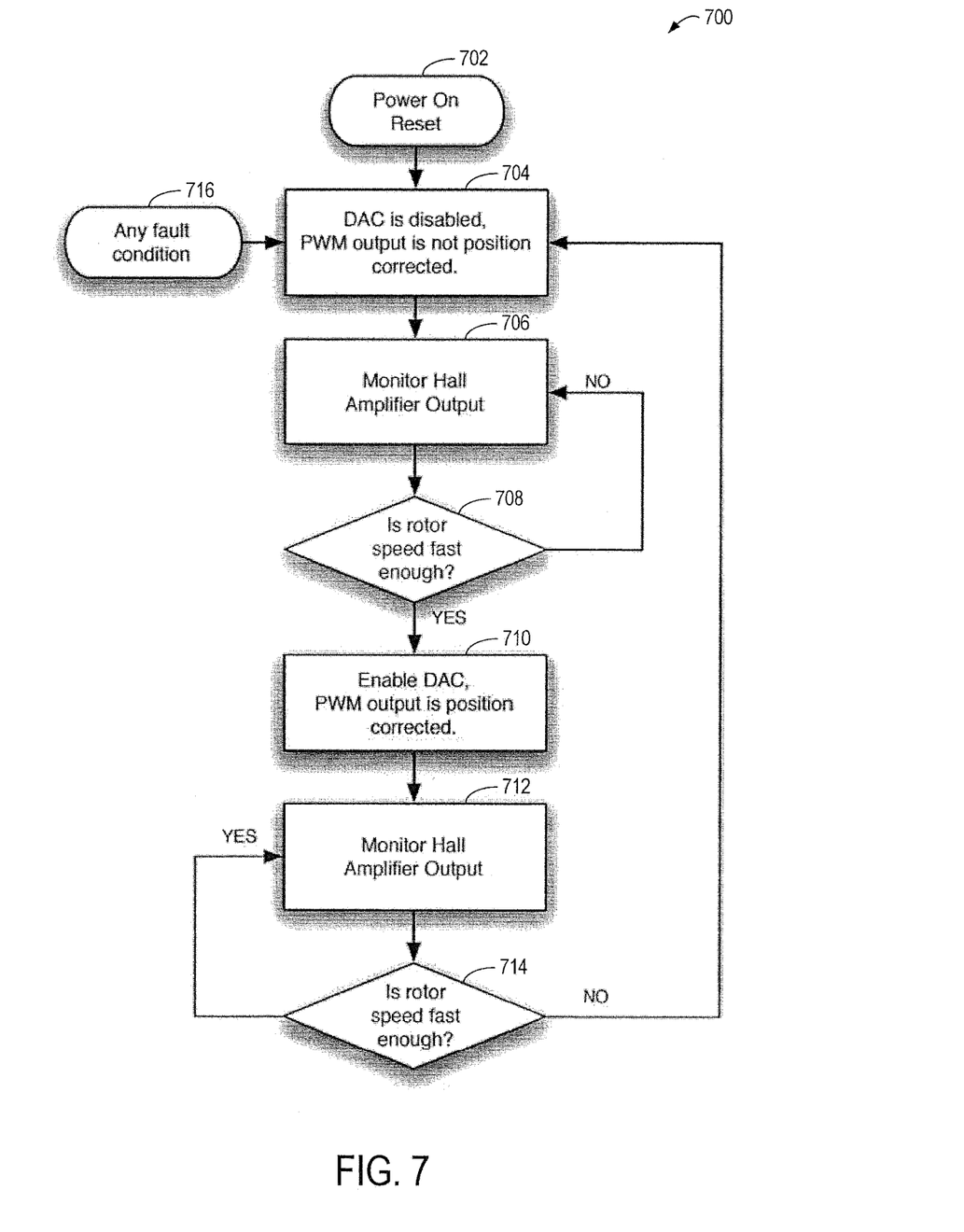
FIG. 7 is a flow chart of an embodiment of a method for controlling when a position dependent speed control gets enabled.

FIG. 7 is a flow chart of an embodiment of a method 700 for controlling when the position dependent speed control gets enabled. Special precautions are needed during degradation conditions and when power is first applied to the motor. If zeros are stored as calibration words in the ROM Correction Table 308, it is possible that the initial DAC output of zero volts will result in an initial position corrected PWM of zero percent duty cycle. If this happens the motor may not spin. To reduce the possibility of this from happening, a startup sequence is needed such that the DAC 310 is initially disabled.

At 702, power is applied to the motor 102 (and the motor control IC 100) at a startup or reset condition. At 704, the power on reset signal disables the DAC output. By disabling the DAC output variance of a pulse train attribute (e.g., pulse width) is disabled and a motor control signal with a fixed pulse width is produced.

After which, at 706, the Hall Amplifier output is constantly monitored to determine the rotor speed. At 708, it is determined if the rotor is spinning faster than a predetermined speed. If so, at 710, the DAC output is enabled to vary the pulse train attribute resulting in position corrected PWM. In some cases, enabling the DAC output re-enables the variance of the pulse train attribute. Otherwise, the DAC remains disabled and the method returns to 706.

At 712, after the DAC output is enabled, the Hall Amplifier output is monitored to determine the rotor speed. At 714, it is determined if the rotor is spinning faster than the predetermined speed. If so, the DAC remains enabled and the method returns to 712. If not, the method returns to 704 where the DAC is disabled.

Conditions of degradation may result in the rotor coming to a complete stop. At 716, a degradation condition is detected and the method moves to 704 where the DAC is disabled. Therefore, all conditions of degradation automatically disable the DAC until the rotor starts spinning again and rotor speed becomes greater than a predetermined threshold speed at which time the variance of the pulse train attribute is re-enabled. Accordingly, the DAC may be disabled in response to a variety of operation conditions including degradation conditions, startup, and/or reset conditions, then re-enabled to ensure operation of the motor.

Thus, the present method can control a brushless direct current motor at a startup or reset condition, generate a motor command signal at a fixed pulse width over a selected angular rotational range of the brushless direct current motor, and in response to a rotor speed of the brushless direct current motor being greater than a predetermined threshold speed, varying the pulse width of the motor command signal between a first non-zero state and a second non-zero state over the selected angular rotational range. In addition, varying includes decreasing the pulse width during a first angular rotational range of the commutation interval, then increasing the pulse width during a second angular rotational range of the commutation interval, and then decreasing the at least one pulse train attribute during a third angular rotational range of the commutation interval. Further, in one embodiment, the rotor torque of the brushless direct current motor in the second angular rotational range is greater than in the a first angular rotational range and the third angular rotational range. Further still, in one embodiment, the pulse width variance is disabled in response to a condition of degradation, then re-enabling variance of the pulse width in response to the rotor speed of the brushless direct current motor being greater than a predetermined threshold speed.

Some applications may require a DAC enable signal to be pinned out as an input to the motor control IC. This option would give the system designer more flexibility in the control of the motor. Disabling the DAC would allow for a higher achievable maximum speed for a given power supply voltage.

Figure 8:
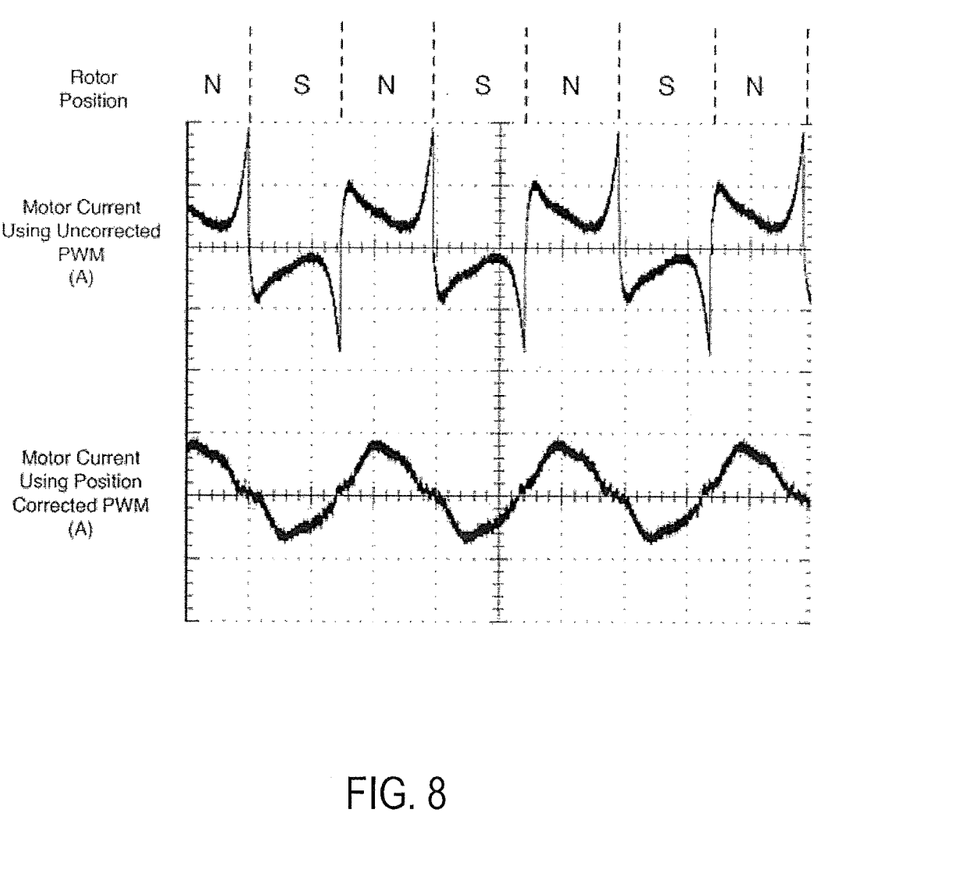
FIG. 8 is an oscilloscope plot comparing the motor current waveforms of an actual BLDC motor with the position corrected PWM enabled and disabled.

FIG. 8 is an oscilloscope plot comparing actual winding current waveforms of a brushless DC motor with the position corrected PWM enabled and disabled, operating at the same speed, and under the same operating conditions. This comparison was made possible with the use of a DAC enable pin on the motor control IC. The top waveform shows the current spikes that occur when traditional PWM waveforms are used to control the speed of the motor. These current spikes result in wasted energy and heat in the motor windings. The bottom waveform shows the current spikes eliminated with the use of position corrected PWM resulting in more energy efficient operation at the same speed. The ROM code correction controlling the DAC is used to correct the waveshape of the motor current.

The choice for correction factors stored in the ROM may vary based on the physical design of the motor, and which performance characteristics are being optimized. For example, the ROM code that optimizes energy efficiency may not be the same code that minimizes torque variation or noise. Also, the optimal code may vary based on the speed of the rotor or on environmental conditions such as temperature, pressure, humidity, and loading, among other things. It may be desirable to optimize different performance characteristics under different conditions. Accordingly, varying a pulse train attribute of the motor control signal may include selecting one of a plurality of correction factor profiles based on at least one operating parameter. For example, it may be desirable for a motor to operate with minimum torque variation at slower speeds, while it operates with greater energy efficiency at higher speeds. Example predefined correction factor profiles may include a torque optimization profile, a noise optimization profile, a speed optimization profile, and a maximum energy efficiency profile, etc.

Figure 9:
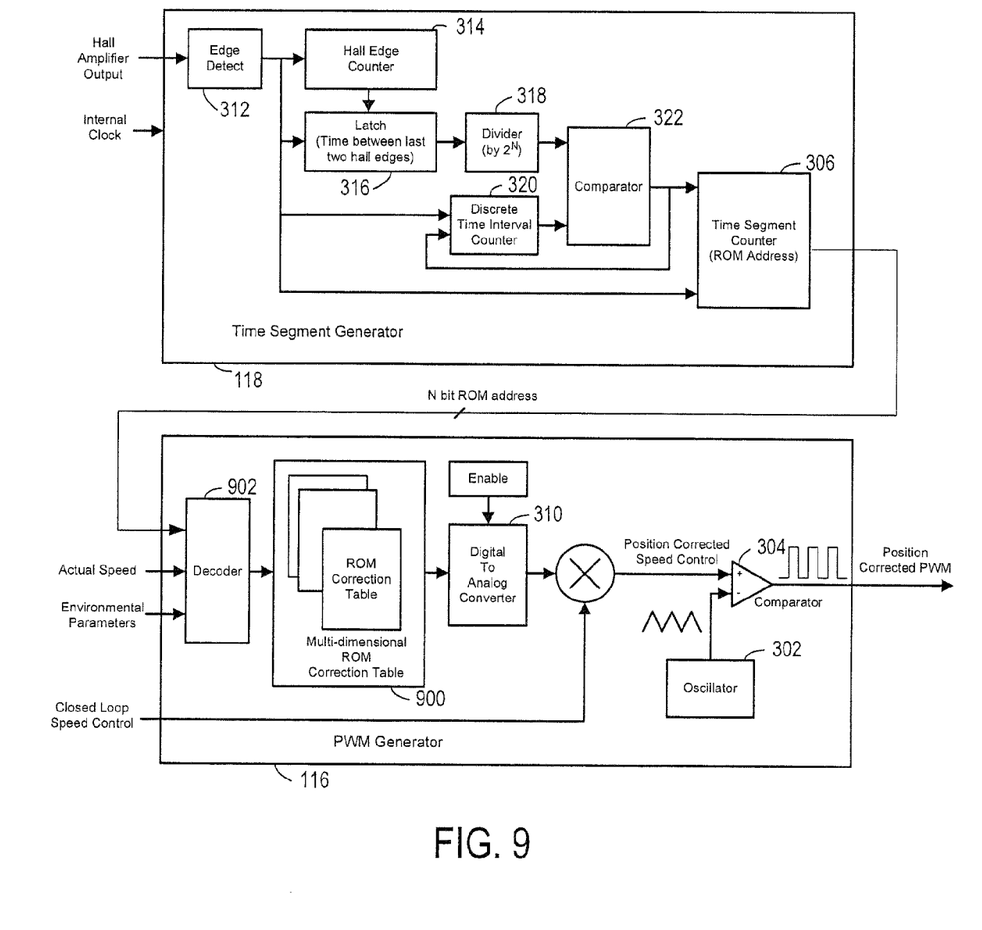
FIG. 9 is a block diagram showing another embodiment of the PWM generator block of FIG. 2 that includes a multi-dimensional ROM correction table.

To accommodate these possibilities, a multi-dimensional ROM correction table can be used with pointers based on as many parameters (e.g. speed and environmental parameters) as needed by the application. Each combination of parameters could have a separate ROM lookup table. FIG. 9 shows an example of this. FIG. 9 is the similar to FIG. 3 except the PWM Generator Block has been modified to accommodate the multi-dimensional ROM 900. The Decoder 902 chooses which portion of the ROM correction table 900 will be used based on the actual speed of the rotor and on the environmental conditions, or other input parameters.

The degree to which a performance characteristic is optimized may be made arbitrarily precise by increasing, the number of time segments N produced by the Time Segment Generator, and by increasing the number of bits used for each digital correction factor stored in the ROM lookup table.

Applications include but are not limited to reducing power consumption in portable devices using brushless DC motors, such as laptop computers, in order to reduce heat and extend battery life. Another application is to reduce audible noise generated by appliances used in noise sensitive environments.

The invention claimed is:

1. A method for controlling a brushless direct current motor, comprising:
    generating a motor command signal during a commutation interval of said brushless direct current motor; and
    adjusting a common attribute of at least two non-zero pulses of said motor command signal such that said at least two non-zero pulses of said motor command signal are not uniform;
    further comprising a third non-zero pulse during said commutation interval, said third non-zero pulse produced after said second pulse, said third non-zero pulse having a shorter duration high level pulse width than said second pulse;

wherein a position of said brushless direct current motor is converted into a time segment counter signal, and wherein said time segment counter signal is modified by a correction and converted to an analog signal;

wherein said analog signal is multiplied by a speed control adjustment and compared to an oscillating signal before being output to said brushless direct current motor; and wherein said common attribute is a pulse width or a pulse amplitude.

2. The method of claim 1, wherein a first pulse of said at least two non-zero pulses has a shorter duration high level pulse width than a second pulse of said at least two non-zero pulses.

3. The method of claim 2, wherein said common attribute is adjusted in response to a position of said brushless direct current motor.

4. The method of claim 1, wherein said brushless direct current motor is a fan motor.

5. The method of claim 1, wherein said correction is selected from a plurality of correction profiles in response to an operating parameter.

6. The method of claim 1, further comprising deactivating adjusting said common attribute of said at least two non-zero pulses in response to a condition of degradation.

7. A method for controlling a brushless direct current motor, comprising:
   at a startup or reset condition, generating a motor command signal at a fixed pulse width over a selected angular rotational range of the brushless direct current motor; and
   in response to a rotor speed of the brushless direct current motor being greater than a predetermined threshold speed, varying the pulse width of the motor command signal between a first non-zero state and a second non-zero state over the selected angular rotational range;
   further comprising disabling variance of the pulse width in response to a condition of degradation, then re-enabling variance of the pulse width in response to the rotor speed of the brushless direct current motor being greater than the predetermined threshold speed;
   wherein the selected angular rotational range is a computation interval, and wherein varying includes decreasing the pulse width during a first angular rotational range of a commutation interval, then increasing the pulse width during a second angular rotational range of the commutation interval, and then decreasing at least one pulse train attribute during a third angular rotational range of the commutation interval; and
   wherein the motor has only two pole pairs.

8. The method of claim 7, wherein a rotor torque of the brushless direct current motor in the second angular rotational range is greater than in the first angular rotational range and the third angular rotational range.

9. A method for controlling a brushless direct current motor, comprising:
   at a startup or reset condition, generating a motor command signal at a fixed pulse width over a selected angular rotational range of a commutation interval of the brushless direct current motor; and
   in response to a rotor speed of the brushless direct current motor being greater than a predetermined threshold speed, varying the pulse width of the motor command signal between a first non-zero state and a second non-zero state over the selected angular rotational range including adjusting the pulse width of said motor command signal such that the first non-zero state and the second non-zero state of said motor command signal are not uniform to correct a waveshape of the motor current wherein the motor has only two pole pairs;
   wherein said position of said brushless direct current motor is converted into a time segment counter signal, and wherein said time segment counter signal is modified by a correction and converted to an analog signal; and
   wherein said analog signal is multiplied by a speed control adjustment and compared to an oscillating signal before being output to said brushless direct current motor.

10. The method of claim 9, wherein the first non-zero state has a shorter duration high level pulse width than the second non-zero state.

11. The method of claim 10, wherein the pulse width is adjusted in response to a position of said brushless direct current motor.

* * * * *